A. M. PRATT.
Corn-Planter.
No. 20,366. Patented May 25, 1858.
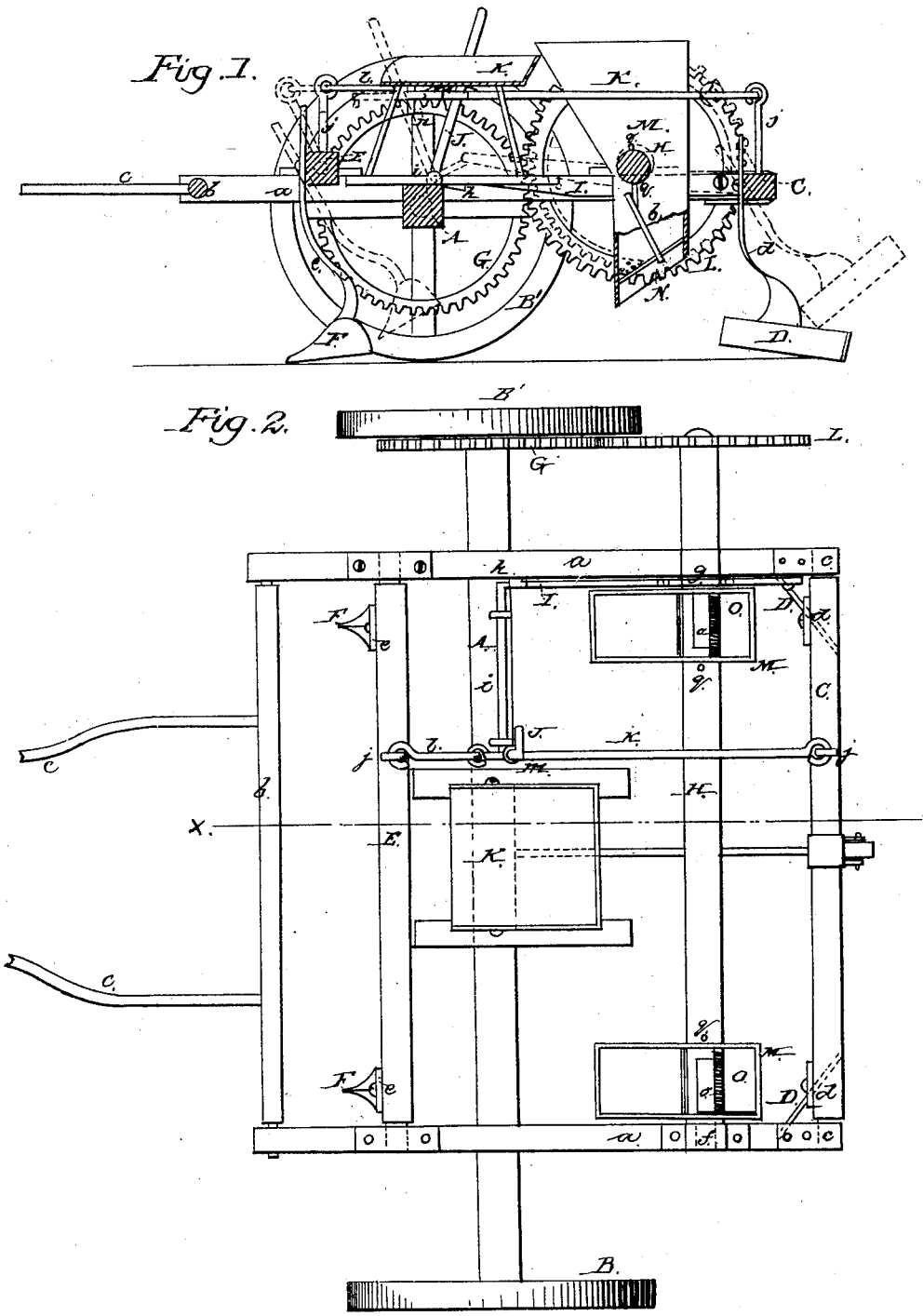

UNITED STATES PATENT OFFICE.

A. M. PRATT, OF LOWELL, NEW YORK.

IMPROVEMENT IN SEEDING-MACHINES.

Specification forming part of Letters Patent No. 20,366, dated May 25, 1858.

*To all whom it may concern:*

Be it known that I, A. M. PRATT, of Lowell, in the county of Oneida and State of New York, have invented a new and Improved Seeding-Machine; and I do hereby declare that the following is a full, clear, and exact description of the same, reference being had to the annexed drawings, making a part of this specification, in which—

Figure 1 is a vertical section of a seeding-machine constructed according to my invention. $x x$, Fig. 2, indicates the plane of section. Fig. 2 is a plan or top view of the same.

Similar letters of reference indicate corresponding parts in the two figures.

This invention consists in a novel arrangement of the furrow and covering shares with the seed-distributing shaft, as hereinafter fully shown and described, whereby the seed-distributing device may be thrown out of gear simultaneously with the elevating of the furrow and covering shares and by the movement of a single lever, so that the machine may be rendered inoperative instantaneously when required—as, for instance, when the machine is to be conveyed from place to place, or in turning at the ends of rows, or in passing over barren or waste spots in fields, where the seed would otherwise be uselessly distributed.

To enable those skilled in the art to fully understand and construct my invention, I will proceed to describe it.

A represents an axle, on the ends of which wheels B B' are placed loosely, B' being the driving-wheel. On the axle A two bars, $a a$, are secured parallel with each other, and one near each end of the axle A and at right angles with it.

Between the front parts of the bars $a a$ a shaft, $b$, is placed, to which shaft the thills $c$ are attached, said shaft being allowed to turn freely between its bars $a$. Between the back parts of the bars $a a$ a shaft, C, is placed. This shaft has its journals fitted in proper bearings, $c c$, attached to the bars $a$, the shaft being allowed to turn freely in its bearings. To this shaft C two covering-shares, D D, are attached, one near each end, the shares being attached to the shaft by shanks $d$, the upper ends of which are slotted longitudinally, set-screws passing through said slots into the shaft C, and thereby rendering them adjustable.

E is a shaft, which is fitted between the bars $a a$ near their front ends, the journals of said shaft being allowed to turn freely in its bearings.

To the shaft E the furrow-shares F F are attached, one near each end. The furrow-shares are attached to the shaft E in the same way as the covering-shares D are attached to shafts C—viz., by shanks $e e$, the upper ends of which are slotted, set-screws passing through the slots into the shaft. The furrow and covering shares are in line with each other, and they may be constructed in any of the known forms.

To the driving-wheel B', at its inner side, a toothed wheel, G, is attached, the wheel G being concentric with the driving-wheel. (See Fig. 1.)

H is a cylindrical shaft, one end of which has its bearings $f$ on one of the bars $a$, and the opposite end has its bearing $g$ in an arm, I, the outer or back end of which is pivoted to the bar $a$, adjoining it. The inner or front end of the arm I rests or bears on a crank, $h$, of a shaft, $i$, fitted on the axle A. The inner end of shaft $i$ has a vertical lever, J, attached, said lever being by the side of the driver's seat K, which is attached to the axle A.

To each shaft C E a vertical rod, $j$, is attached. The rod $j$ of the shaft C is connected by a bar, $k$, with the lever J, and the rod $j$ of the shaft E is connected by a bar, $l$, with the bar $k$, the latter having an eye, $m$, formed at its front end, and the bar $l$ having a hook, $n$, formed on its inner end, the hook $n$ fitting in the eye $m$.

On the end of the shaft H, adjoining the driving-wheel B', a toothed wheel, L, is secured. The shaft H passes through two seed-boxes, M M, which are attached to the bars $a a$, one to each, and the shaft H. The portions within the boxes have seed holes or recesses $o$ made in it, and a bush or cut-off, O, is fitted within each seed-box.

At the bottom of each seed-box M a valve, N, is placed, said valves having each a rod, $p$, attached, said rods (and consequently the valves) being operated by pins $q$ on shaft H, in connection with springs attached to them in any proper way.

The operation is as follows: As the machine is drawn along the shaft H is rotated from the driving-wheel B' by means of the gearing G L, and the seed is removed from the boxes M by the recesses $o$, which, as the shaft H rotates, deposit into the lower ends of the seed-boxes a requisite amount of seed, said seed being allowed to pass from the boxes M as the valves N are opened. This means of distributing the seed is quite common and well known, and therefore it does not require a minute description. At any time when the seed does not require to be distributed and the machine at the same time drawn along, the driver on seat K merely throws forward the upper end of lever J, and the two shafts E C will be turned a certain distance and the shares F F D D elevated, as shown in red, and the front or outer end of lever I will also be elevated at the same time in consequence of the turning of the crank $h$, and the wheel L on shaft H will be thrown out of gear with the wheel G on the driving-wheel B', simultaneously with the elevating of the shares D F, so that the machine, by the movement of a single lever, is instantly rendered inoperative.

I do not claim the seed-distributing devices, for that is in common use and well known; but,

Having thus described my invention, what I claim as new, and desire to secure by Letters Patent, is—

Attaching the furrow and covering shares F D respectively to shafts E C, which are allowed to turn in their bearings and are connected by the rods $k$ $l$ to the lever J, when said parts thus arranged are used in connection with the shaft $i$, attached to the lever J, crank $h$, and lever I, which support one end of the seed-distributing shaft H, the whole being arranged to operate as and for the purpose set forth.

A. M. PRATT.

Witnesses:
 WM. WYLIE,
 CHAS. P. SHERMAN.